April 16, 1929. L. W. BROWNE 1,709,388
PRESSURE REGULATOR REDUCING VALVE
Filed April 20, 1927
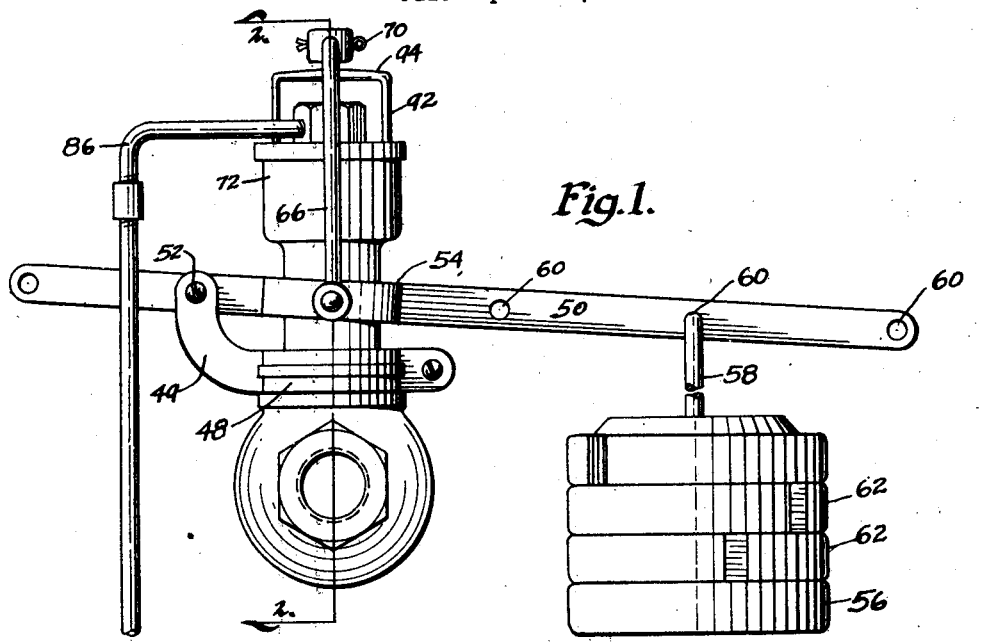
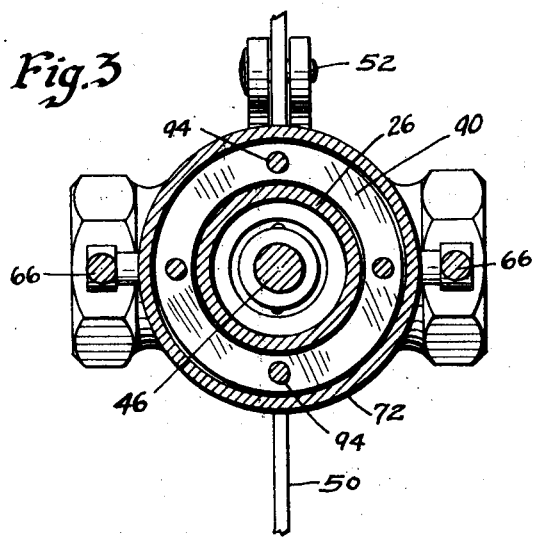
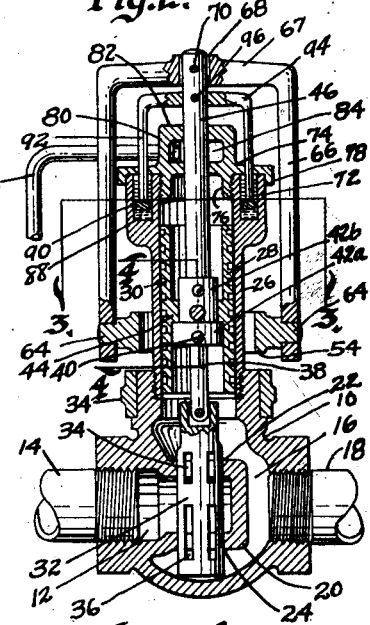
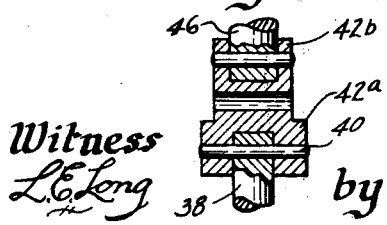
Witness
L. E. Long
Inventor
Lyle W. Browne
by Bair & Freeman Attorneys.

Patented Apr. 16, 1929.

1,709,388

UNITED STATES PATENT OFFICE.

LYLE W. BROWNE, OF MARSHALLTOWN, IOWA, ASSIGNOR TO THE FISHER GOVERNOR COMPANY, INC., OF MARSHALLTOWN, IOWA.

PRESSURE-REGULATOR-REDUCING VALVE.

Application filed April 20, 1927. Serial No. 185,244.

The object of my invention is to provide a pressure regulator reducing valve of simple and durable and inexpensive construction.

More particularly, it is my object to provide such a reducing valve of the type which is equipped with a dash pot control for preventing vibration or chattering of the valve, which structure involves the mounting of the dash pot on the valve casing in such manner as to subject it to the heating action of the steam passing through the valve casing for thus preventing the oil in the dash pot from congealing.

With these and other objects in view, my invention consists in the construction, arrangement and combination of the various parts of my pressure regulator reducing valve, whereby the objects contemplated are attained, as hereinafter more fully set forth, pointed out in my claims, and illustrated in the accompanying drawings, in which:

Figure 1 shows a side elevation of a pressure regulator reducing valve for steam lines embodying my invention.

Figure 2 is a vertical, central, sectional view through the valve structure taken on the line 2—2 of Figure 1.

Figure 3 is a horizontal, sectional view of the dash pot and connected parts taken on the line 3—3 of Figure 2; and Figure 4 is a central view taken on the line 4—4 of Figure 2.

It is frequently desirable to provide in a steam line a reducing valve, whereby pressure on the service side of the valve may be maintained at a predetermined amount.

For this purpose, I have provided a valve casing indicated generally in the accompanying drawings by the reference numeral 10.

The valve casing has the inlet passage 12 connected with an inlet or supply pipe 14 and the outlet passage 16 connected with a service pipe 18.

Projected into the hollow casing from the inlet passage 12 is a cage 20 having upper and lower valve openings 22 and 24.

Screwed into the top of the valve casing is a hollow cylinder 26 in which is mounted the hollow stem piston 28 provided with annular sealing grooves 30 in its outer surface.

The piston 28 is arranged to slide vertically in the cylinder 26.

Mounted to slide in the valve openings 22 and 24 of the valve cage 20 is a cylinder-shaped valve 32, which has the upper slots 34 and the lower slots 36, vertically elongated and so arranged that when the valve is at the lower position of its movement, the slots allow free passage of steam from the inlet 12 through said slots and through the openings 22 and 24 to the outlet side of the valve casing and to the cylinder 26. These slots 34 and 36 are of such length that when the valve is raised toward its upper limit of movement, their lower ends are above the lower ends of the openings 22 and 24, whereupon these valve passages are closed.

Pivoted to the upper end of the valve 32 is a valve link 38, which extends upwardly into the cylinder 26 and is pivoted by a pin 40 to the stem block 42, which consists of a cylindrical portion $42^a$ and a portion $42^b$ also cylindrical of smaller diameter than the portion $42^a$, projecting upwardly from the portion $42^a$. The portion $42^a$ of the stem block 42 fits smoothly in the cylinder 26.

Just above the stem block portion $42^a$, the cylinder 26 is provided with an internal, annular rib 44 through which the portion $42^b$ projects.

Pivoted in the upper end of the portion $42^b$ is an upwardly projecting piston rod 46.

Mounted on the upper part of the valve casing 10 is a split ring clamp 48, having the upwardly extending arm 49 forming a bracket for the lever 50. The lever 50 is pivoted to the arm 49 as at 52 and has intermediate of its length the ring 54 loosely receiving the cylinder 26. A weight 56 has a stem 58 hooked selectively into one of several spaced holes 60 in the lever 50. Additional weights 62 may be mounted on the weight 56.

Pivoted to the opposite sides of the ring 54 as at 64 are the arms 66 of a yoke 67, which has in its central cross member at its upper end a hole 68 into which the piston rod 46 projects, as shown in Figure 2.

A cotter pin or the like 70 is projected through the yoke member 67 in the upper end of the piston rod 46, as shown in Figures 1 and 2.

Formed around the upper end of the cylinder 26 is an upwardly, opening, annular chamber 72 forming part of a dash pot.

A cover plate 74 has a downwardly, projecting, cylindrical extension 76 screwed into the upper end of the cylinder 26, and a downwardly projecting flange 78 to fit the outer edge of the dash pot chamber 72, as shown in Figure 2. This plate 74 forms a cylinder and dash pot cover.

The plate 74 has an upwardly extending cylindrical portion 80 with a closed upper end 82 forming a compartment 84.

The piston rod 46 is slidably extended through the plate 74 and top or cover member 82.

A vent pipe 86 leads from the compartment 84.

The chamber 72 contains oil or the like 88. Received in the chamber 72 is an annular dash pot piston 90. The arms 92 of a yoke having the central cross member 94 are connected with the dash pot piston 90 and slidably extend upwardly through the plate 74 as shown in Figure 2.

The cross member 94 of the dash pot piston yoke has the piston rod 46 extended through it and secured to it by means of a pin or the like 96.

I will now describe the practical operation of my improved reducing valve.

Assume that the pipe 14 is connected with a container for steam at a relatively high pressure and that it is desired to maintain steam at a relatively lower pressure in the pipe 18.

It will be seen that when there is no pressure in the pipe 18, the valve 32 will be held in its lower position by gravity and steam will pass through the inlet passage 12 and slots 34 and 36 and the valve passages 22 and 24 to the outlet passage 16 and the pipe 18.

As the pressure in the pipe 18 rises, it will act on the stem block 42 for raising the stem block, the piston 28, the yoke members 67 and 66 and the lever 50 and the weight 56.

Whenever the pressure on the outlet side of the valve becomes great enough to raise the weight 56, the valve 32 will be raised until the valve passages are closed.

The pressure to be maintained on the service side of the valve may be regulated by placing as many weights 62 on the weight 56 as is desired to accomplish the purpose.

One of the problems involved in the production of a satisfactory reducing valve for steam lines arises from the fact that when the valve movements occur, they are likely to be such as to cause chattering or vibration of the valve, and thereby result in undue wear on the valve parts.

To eliminate the chattering, I have provided the dash pot structure, whereby the movement of the valve toward opening or closing position is steadied.

In providing a dash pot structure for this purpose, difficulties frequently occur owing to the fact that the oil 88 in the dash pot does not remain at the same consistency or at nearly enough the same consistency. For instance in cold weather, it is difficult to keep the oil in a sufficiently fluid state.

In order to insure the maintaining of proper fluidity of the oil, I have formed the dash pot chamber at the upper end of the piston cylinder, where it will always be kept warm by reason of the heat of the steam passing through the valve or to which the valve structure is subjected. The dash pot chamber, being thus warmed, the oil will never congeal or get stiff.

It will be noted that I have shown in the drawings herewith four of the yoke arms 92 connected by two cross members 94. This structure is provided simply to insure a more even action of the dash pot piston 90.

It will be seen that by using a different number of weights 62 and by mounting the stem or rod 58 at different points on the lever 50, I am enabled to control the pressure on the service side of the steam line for maintaining it wherever desired.

The parts are of comparatively simple construction for a valve of this type, and the manner of arranging the dash pot on the piston cylinder and connecting the dash pot piston with the piston rod 46 affords a simple, efficient and economical structure, whereby the dash pot oil may be maintained at the proper temperature to prevent the congealing of the oil, and the dash pot piston may be properly and effectively connected with the piston rod.

I claim as my invention:

1. In a structure of the class described, a valve casing having inlet and outlet openings, a valve for controlling fluid flow from one to the other of said openings, a cylinder mounted on the valve casing and communicating with the valve casing on one side of said valve, a piston in said cylinder, a stem connecting the valve and the piston, a dash pot chamber formed at the upper end of said cylinder, a cover cap for the dash pot chamber and the cylinder, a piston rod connected with said piston and projecting through said cover, a yoke having its central portion connected with said rod beyond the cover, a supporting means, a lever pivoted to said supporting means, said yoke having its arms pivoted to said lever, a dash pot piston in said dash pot chamber, a yoke having its arms connected with said dash pot piston and projecting through said cover and connected with the piston rod.

2. In a structure of the class described, a valve casing having inlet and outlet openings, a valve for controlling fluid flow from one to the other of said openings, a cylinder mounted on the valve casing and communicating with the valve casing on one side of said valve, a piston in said cylinder, a stem connecting the valve and the piston, a dash pot chamber formed at the upper end of said cylinder, a cover cap for the dash pot chamber and the cylinder, a piston rod connected with said piston and projecting through said cover, a yoke having its central portion connected with said rod beyond the cover, a supporting means, a lever pivoted to said supporting means, said yoke having its arms pivoted to said lever, a dash pot piston in said dash pot chamber, a yoke having its arms connected with said dash pot piston and projecting through said cover and connected with the piston rod, and a chamber arranged above said cover, and a vent pipe leading from said last-named chamber.

3. In a structure of the class described, a valve structure including a casing, a cylinder connected with said casing, a piston in said cylinder, a valve for controlling flow through the valve casing connected with said piston, means for imposing pressure on the piston for holding the valve at one limit of its movement, said means including a piston rod, a dash pot chamber formed on and surrounding said cylinder, a washer like dash pot piston therein and surrounding said cylinder, and means for operatively connecting the dash pot piston with said piston rod.

Des Moines, Iowa, March 30, 1927.

LYLE W. BROWNE.